(No Model.)

S. LANCESKES.
TRACTION WHEEL.

No. 308,905. Patented Dec. 9, 1884.

WITNESSES.
Frank Pardow
George Hammer

INVENTOR.
Stephen Lanceskes
by J. G. Hewitt
Attorney

UNITED STATES PATENT OFFICE.

STEPHEN LANCESKES, OF LOUISVILLE, KENTUCKY.

TRACTION-WHEEL.

SPECIFICATION forming part of Letters Patent No. 308,905, dated December 9, 1884.

Application filed May 5, 1884. (No model.)

*To all whom it may concern:*

Be it known that I, STEPHEN LANCESKES, a citizen of the United States, residing at Louisville, in the county of Jefferson and State of Kentucky, have invented a certain new and useful Improvement in Wheels for Traction-Engines; and I do hereby declare that the following is a full, clear, and exact description of the construction and operation of the same, reference being had to the accompanying drawings, forming part of the specification.

This invention relates to a certain new and useful improvement in wheels for traction-engines, consisting, first, in a metal rim of the required dimensions, with flanges on the edge, and a set of spokes or arms on each side secured thereto, extending into and connecting with the hub, which is made in two parts, with the inner ends of each so reduced as to form bearings upon which a central ring is made to work loosely, and to which a series of arms, eight in number, are hinged by means of lugs on the verge, so that the end of the arms may rest firmly against the ring. The outer ends of these arms are each provided with a metal traction-lug about two-thirds the width of the face, working through openings in the face of the wheel in such manner as to be easily protruded or retracted at pleasure by simply turning the central ring, and kept in place, when the cogs are withdrawn, by circular guides secured to the rim of the wheel.

When the machine is used on macadamized roads, bridges, or hard level ground, smooth-faced wheels would be preferable; but when used for drawing heavy loads it is necessary to have protruding lugs or teeth in the rim of the wheels, to give the necessary traction required to draw the load.

The object of this invention is to provide a wheel for traction-engines having traction-lugs susceptible of being protruded from the rim, in order to give the required traction necessary to draw a heavy load on soft ground, and also retract them again when upon ground having a smooth hard surface, in order to prevent the shock that would otherwise take place by the projecting lugs coming in contact therewith.

Figure 1:
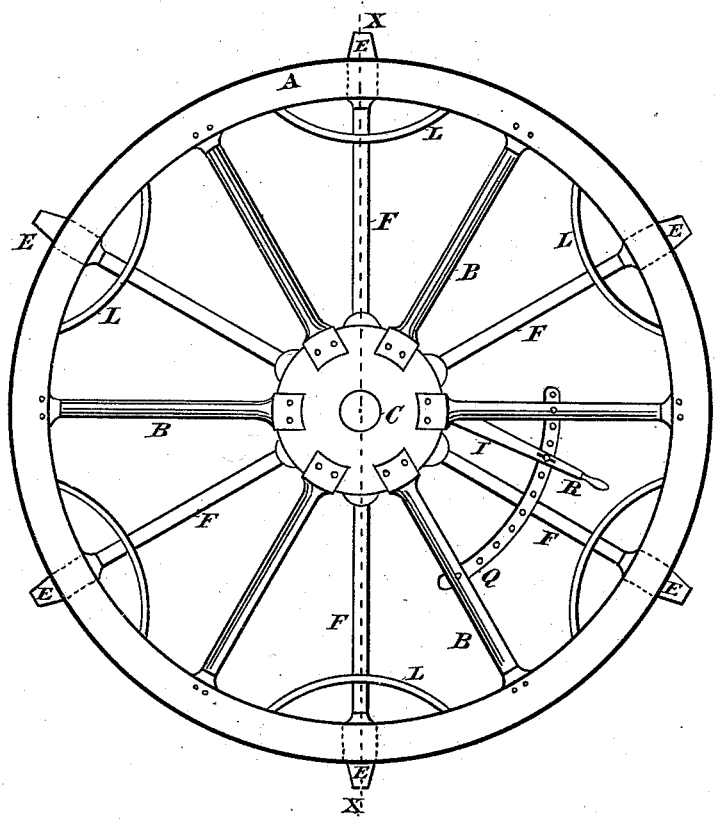
Figure 2:
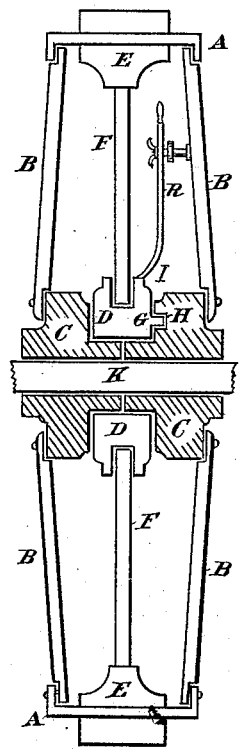
Figure 3:
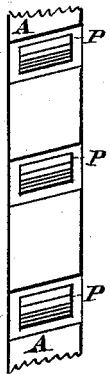

I attain the above object by the mechanism illustrated in the drawings, in which Figure 1 is a side elevation of the wheel, showing the spokes of the wheel and arms of the protruding traction-lugs. Fig. 2 is a sectional view of the wheel, taken as indicated by X X, showing the interior arrangement of the several parts. Fig. 3 is a flat view of part of the face of the wheel, showing the angle of the traction-lugs.

Similar letters refer to similar parts throughout the several views.

In the drawings, A is the rim of the wheel, which is made of metal and in form as shown in the drawings, with flanges at the side and angle-openings P in the face for the traction-lugs E to work through.

B B are the spokes, and C C is the hub, which is made in two pieces, bolted together or otherwise, with the inner ends so reduced where they connect as to form a journal-bearing for the ring D, to which the traction-lugs E E are hinged by means of suitable arms, F F, between them, one end of which being fastened permanently in the traction-lug, while the other is hinged to the ring D by lugs on its face in such manner as to cause the ends to rest firmly against the ring when the cogs are protruded, in which position they are held by a small pin, G, in the side of the ring D, working in a slot, H, in the hub C, with a stop at the end to hold the ring D firmly in position when the traction-lugs are protruded, and when retracted are held in position by the lever I, by which the ring D is operated. This lever I is inserted in the ring D centrally, with an offset near the base, to bring the end out between the arms F and spokes B, to which a circular plate, Q, is secured, perforated with small holes, and to which the lever I is fastened by means of a set-screw when the traction-lugs are retracted.

K is the axle, and L L are the circular guides for the arms F F, the openings for which are elongated, so as to permit the arms to oscillate in operating the lugs, which is done by simply turning the ring D by means of the lever I until the lugs are fully protruded, and when necessary to withdraw them turn the lever in an opposite direction, and when fully withdrawn fasten it by the set-screw R. Therefore,

What I claim as my invention, and desire to secure by Letters Patent, in wheels for traction-engines, is—

1. In traction-wheels, the hub C, made in two pieces, having fixed flanges to receive the spokes, with the inner ends of the hub-pieces reduced to form bearings for the ring D to work upon, substantially as herein described, and for the purpose set forth.

2. The hub C, the ring D, working loosely between the fixed flanges on the hub C, as above described, having pin G in the side and slot H in the side of the flange, to hold the traction-cogs in position when protruded, in combination with the lever I, traction-cogs E E, and circular guides L L, having elongated holes for the arms F F, substantially as herein described, and for the purpose set forth.

STEPHEN LANCESKES.

Witnesses:
FRANK PARDON,
GEORGE HAMMER.